United States Patent
Ok et al.

(10) Patent No.: US 7,733,355 B2
(45) Date of Patent: Jun. 8, 2010

(54) APPARATUS AND METHOD OF TRANSFORMING THREE COLOR SIGNALS INTO MULTI-COLOR SIGNAL

(75) Inventors: Hyunwook Ok, Gyeonggi-do (KR); Seongdeok Lee, Gyeonggi-do (KR); Changyeong Kim, Yongin-si (KR); Wonhee Choe, Gyeongiu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1379 days.

(21) Appl. No.: 11/117,292

(22) Filed: Apr. 29, 2005

(65) Prior Publication Data
US 2005/0244055 A1    Nov. 3, 2005

(30) Foreign Application Priority Data
Apr. 30, 2004    (KR) ............... 10-2004-0030652

(51) Int. Cl.
*G09G 5/02* (2006.01)
(52) U.S. Cl. .............. 345/603; 345/601; 345/604
(58) Field of Classification Search ........... 345/600, 345/601, 602, 603, 604
See application file for complete search history.

(56) References Cited

U.S. PATENT DOCUMENTS 5,987,168 A * 11/1999 Decker et al. ............... 382/167
7,167,276 B2 * 1/2007 Wang et al. .................. 358/1.9

FOREIGN PATENT DOCUMENTS

WO    WO 02/099557 A2 * 12/2002

* cited by examiner

*Primary Examiner*—Kee M Tung
*Assistant Examiner*—Carlos Perromat
(74) *Attorney, Agent, or Firm*—Staas & Halsey LLP

(57) ABSTRACT

A method of and apparatus for transforming a three color signal into a multi-color signal. A method of transforming a color signal having three color components into a color signal having first through n-th color components, includes: producing a lookup table having signal values of (n-3) of n color components of a color within a three-dimensional color space and reference variables corresponding to the signal values of the (n-3) color components; extracting the reference variables from an input color signal; determining the signal values of the (n-3) color components corresponding to the extracted reference variables from the lookup table; and producing a color signal having n color components using the determined signal values of the (n-3) color components.

29 Claims, 15 Drawing Sheets

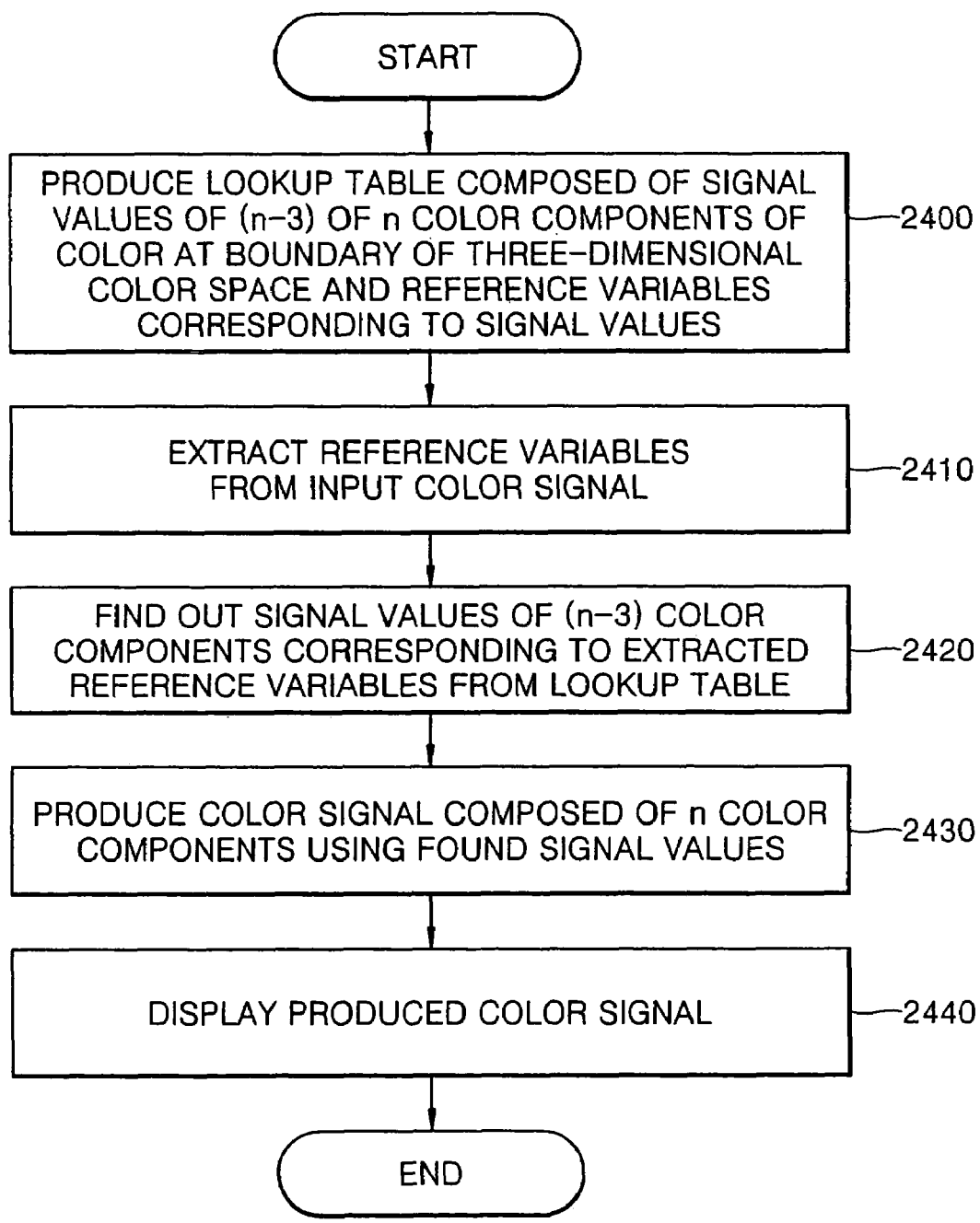

APPARATUS AND METHOD OF TRANSFORMING THREE COLOR SIGNALS INTO MULTI-COLOR SIGNAL

CROSS-REFERENCE TO RELATED APPLICATIONS

This application claims the benefit of Korean Patent Application No. 10-2004-0030652, filed on Apr. 30, 2004, in the Korean Intellectual Property Office, the disclosure of which is incorporated herein in its entirety by reference.

BACKGROUND OF THE INVENTION

1. Field of the Invention

The present invention relates to an apparatus for transforming a three-color signals into a multi-color signal to display an image, and more particularly, a method and apparatus for transforming a three-color signal into a multi-color signal, by which multiple color signal values corresponding to reference variables extracted from an input color signal composed of three color components are determined from a lookup table, and the found multiple color signal values are used to extract the remaining multiple color signal values.

2. Description of Related Art

With a development of electronics engineering, information provided to users includes not only simple texts but also a variety of multi-media information. The multi-media information includes not only text information but also various types of information, such as a still image, a moving image, an animation, a sound, and the like. Particularly, a moving image is the basis of a next-generation service, such as, a video on demand (VOD) service or an interactive service, so a study on a related draft standard is being actively made.

Due to a development of digital electronics engineering technology, conventional analog data is transformed into digital data. To effectively deal with a vast amount of digital data, a variety of techniques of processing a digital video material have appeared. Digital image processing techniques have the following advantages.

First, because noise is added to an original signal when each analog device performs a function, the quality of an image is degraded during a noise removal process. However, digital image processing apparatuses prevent the degradation of the image quality.

Second, since a signal is digitalized, the signal can be processed using a computer. Hence, signal processing, such as compression of image information or the like, is possible.

Digital image processing techniques relate to how analog data recorded on a medium can be represented using a computer. The possibility of a digital video was realized by a digital video interactive (DIV) system proposed by researchers at the RCA corporation at the end of the 1980's. The DIV system uses a special processor that is capable of microprogramming and executes a command suitable for image processing, thereby executing a function difficult to be processed in real time by general processors.

The Joint Photographics Experts Group (JPEG) and Motion Pictures Experts Group (MPEG), which were launched in 1989, set a standard coding method that is difficult to be implemented via hardware but has a performance exceedingly superior to that of the DIV system. Because the standard coding method is supported by many companies, it is anticipated to play an important role in the digital video development. In particular, MPEG standards have been continuously developed to, for example, MPEG II and then to MPEG III in order to achieve not only image processing on PCs but also digitalization of a high-definition system, such as, an HDTV.

Various techniques of processing an image using only the processing capability of a main processor without special hardware have been introduced since 1991. At present, representative examples of this technique include Apple's QuickTime, Microsoft's Video-for-Windows, and Intel's Indeo. Theses image-processing techniques are spotlighted especially by PCs because of a high-speed main processor.

This introduction of various digital image processing techniques causes a necessity for standardization. Due to the standardization, the digital image processing techniques are widely used, like being compatibly shared by not only a video conference system, a digital broadcasting codec system, and a video telephone industry but also a computer industry, a communications industry, and the like. For example, a digital video compression for information storage in optical disks, such as, CD-ROMs, or digital storage media is achieved by almost the same base technique as that used for compression for video communications and the like. Current MPEG standardization driven by ISO-IEC, JTC1, SC1, and WG11 is under progress since MPEG was launched in the 1990's.

However, a conventional video signal is processed in a three-dimensional color space of red (R), green (G), and blue (B) colors and displayed using three color light sources. The reason why a video signal is displayed using three color signals, namely, RGB signals, is that the three colors R, G, and B are primary colors which can be used to generate most remaining other colors. In general, in image display using three color light sources, namely, R, G, and B light sources, every color is represented by a combination of R, G, and B colors. In this case, representation of a composite color obtained using R, G, and B colors on a color coordinate is not enough. Since more colors can be recognized by a human being than colors obtained by combining three colors R, G, and B, colors that cannot be represented using R, G, and B can be represented by adding a new color to the three colors. Thus, a color close to a natural color can be represented.

FIG. 1 illustrates a relationship between primary colors used to represent a color. As illustrated in FIG. 1, every color signal can be represented by a combination of three primary colors, namely, R, G, and B. When R and G signals are combined, a yellow (Y) signal is produced. When G and B signals are combined, a cyan (C) signal is produced. When B and R signals are combined, a magenta (M) signal is produced. When the R, G, and B signals are all combined, a white (W) signal is produced.

FIG. 2 is a graph showing colors that can be recognized by human being and chromaticity coordinates of RGB-combined colors. As illustrated in FIG. 2, all of the chromaticity coordinates defined by a triangle of R, G, and B can be represented by combining three color signals, namely, R, G, and B color signals. However, it is not possible to reproduce colors existing outside the triangle of colors existing within a closed curve, which is an area of colors that can be recognized by human being, using only R, G, and B color signals.

FIG. 3 is a block diagram conceptually illustrating an operation of a conventional three-color display device. As illustrated in FIG. 3, the conventional three-color display device receives and displays an input signal having three color components Ri, Gi, and Bi.

The following techniques have been introduced as a method of converting an input signal into a color signal having multiple color components. First, U.S. Pat. No. 6,633,302 assigned to the Olympus Corporation discloses a color conversion performed using a XYZ color space. In systems using 5 or more primary colors, this color conversion includes a very complicate color-space division process and consequently its implementation is difficult.

Second, in a technique proposed by the Genoa Company, a three-dimensional lookup table is reduced to a two-dimensional lookup table, and the two-dimensional lookup table undergoes mapping. An additional one-dimensional lookup table is used to match sizes of two-dimensional color areas for luminance levels with one another. However, this technique also includes a very complicate lookup table calculating process. Furthermore, since a maximum chroma value and a maximum luminance value that can be represented by a multi-color display device vary depending on the type of a method used to convert a color space, the quality of an output image may be degraded.

BRIEF SUMMARY

An aspect of the present invention provides a method and apparatus for transforming a three-color signal into a multi-color signal, by which some color signal values corresponding to reference variables extracted from an input color signal composed of three color components are found out from a lookup table, the found color signal values are used to extract the remaining color signal values, so that multi-color display can be easily achieved within a small error range.

According to an aspect of the present invention, there is provided a method of transforming a color signal having three color components into a color signal having first through n-th color components, the method including: producing a lookup table having signal values of (n-3) of n color components of a color within a three-dimensional color space and reference variables corresponding to the signal values of the (n-3) color components; extracting the reference variables from an input color signal; determining the signal values of the (n-3) color components corresponding to the extracted reference variables from the lookup table; and producing a color signal having n color components using the determined signal values of the (n-3) color components.

The operation of producing a color signal may include: removing a signal having signal values of the found (n-3) color components from the input color signal; and calculating signal values of three color components remaining by removing the (n-3) color components from the input color signal.

The operation of removing a signal may include: producing a color signal of a three-dimensional color space using the determined signal values of the (n-3) color components; and removing the produced color signal from the input color signal.

The method may further include displaying the color signal having the n color components.

According to another aspect of the present invention, there is provided a method of transforming a color signal having three color components into a color signal having first through n-th color components, the method including: producing a lookup table having signal values of (n-3) of n color components of a color at a boundary of a three-dimensional color space and reference variables corresponding to the signal values of the (n-3) color components; extracting the reference variables from an input color signal; determining the signal values of the (n-3) color components corresponding to the extracted reference variables from the lookup table; and producing a color signal having n color components using the determined signal values of the (n-3) color components.

The reference variables may be a luminance signal and a hue signal. The operation of producing a color signal may include: transforming the determining signal values of the (n-3) color components of the color at the boundary of the color space into signal values of the (n-3) color components of the input color signal; removing a signal having the transformed signal values of the (n-3) color components from the input color signal; and calculating signal values of three color components remaining by removing the (n-3) color components from the input color signal.

In the operation of transforming the determined signal values, the determined signal values of the (n-3) color components of the color at the boundary of the color space may be transformed into the signal values of the (n-3) color components of the input color signal using a chroma signal of the input color signal. The operation of removing a signal may include: producing a color signal of a three-dimensional color space using the transformed signal values of the (n-3) color components; and removing the produced color signal from the input color signal.

The method may further include displaying the color signal composed of the n color components.

According to another aspect of the present invention, there is provided an apparatus for transforming a color signal having three color components into a color signal having first through n-th color components, the apparatus includes: a look up table LUT production unit producing a lookup table having signal values of (n-3) of n color components of a color within a three-dimensional color space and reference variables corresponding to the signal values of the (n-3) color components; a reference variable extraction unit extracting the reference variables from an input color signal having three color components; an LUT referring unit receiving the extracted reference variables and determining the signal values of the (n-3) color components corresponding to the extracted reference variables from the lookup table; and a color signal production unit producing a color signal composed of n color components using the determined signal values of the (n-3) color components.

The color signal production unit may include: a three color component extraction unit removing a signal having signal values of the determined (n-3) color components from the input color signal; and a signal value calculation unit calculating signal values of three color components remaining by removing the (n-3) color components from the input color signal.

The three color component extraction unit may include: a three-color signal production unit producing a color signal of a three-dimensional color space using the determined signal values of the (n-3) color components; and a signal removal unit removing the color signal produced by the three-color signal production unit from the input color signal.

The apparatus may further include a display unit displaying the color signal having the n color components.

According to another aspect of the present invention, there is provided an apparatus for transforming a color signal having three color components into a color signal having first through n-th color components, the apparatus including: a look up table LUT production unit producing a lookup table having signal values of (n-3) of n color components of a color at a boundary of a three-dimensional color space and reference variables corresponding to the signal values of the (n-3) color components; a reference variable extraction unit extracting the reference variables from an input color signal having three color components; an LUT referring unit receiving the extracted reference variables and determining the signal values of the (n-3) color components corresponding to the extracted reference variables from the lookup table; and a color signal production unit producing a color signal having n color components using the determined signal values of the (n-3) color components.

The reference variables may be a luminance signal and a hue signal. The signal production unit may include: a referred value transformation unit transforming the determined signal values of the (n-3) color components of the color at the boundary of the color space into signal values of the (n-3) color components of the input color signal; a three color component extraction unit removing a signal having the transformed signal values of the (n-3) color components from the input color signal; and a signal value calculation unit calculating signal values of three color components remaining by removing the (n-3) color components from the input color signal.

The referred value transformation unit may transform the determined signal values of the (n-3) color components of the color at the boundary of the color space into the signal values of the (n-3) color components of the input color signal using a chroma signal of the input color signal. The three color component extraction unit may include: a three-color signal production unit producing a color signal of a three-dimensional color space using the transformed signal values of the (n-3) color components; and a signal removal unit removing the color signal produced by the three-color signal production unit from the input color signal.

This apparatus may further include a display unit displaying the color signal composed of the n color components.

According to another aspect of the present invention, there is provided an apparatus for transforming an input color signal having three color components into a color signal having first through n-th color components, including a look up table (LUT) production unit producing a lookup table having signal values of a specified number of n color components of a color within a three-dimensional color space and reference variables corresponding to the signal values of the specified number of color components; a LUT referring unit receiving extracted reference variables from the input color signal and determining the signal values of the specified number of color components corresponding to the extracted reference variables; and a color signal production unit producing a color signal having n color components using the determined signal values of the specified number of color components.

According to another aspect of the present invention, there is provided an apparatus for transforming an input color signal having three color components into a color signal having first through n-th color components, including: a look up table LUT production unit producing a lookup table having signal values of a specified number of n color components of a color at a boundary of a three-dimensional color space and reference variables corresponding to the signal values of the specified number of color components; an LUT referring unit receiving the extracted reference variables from the input color signal and determining the signal values of the specified number of color components corresponding to the extracted reference variables from the lookup table; and a color signal production unit producing a color signal having n color components using the determined signal values of the specified number of color components.

According to other aspects of the present invention, at least the method of transforming the three-color signal into the multi-color signal and the method of displaying multiple colors using the transformed multi-color signal may be implemented using a computer-readable storage medium encoded with processing instructions for causing a processor to perform the methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 24 is a flowchart illustrating a multi-color displaying method using a method of transforming a three-color signal into a multi-color signal, shown in FIG. 17.

DETAILED DESCRIPTION OF EMBODIMENTS

Figure 1:
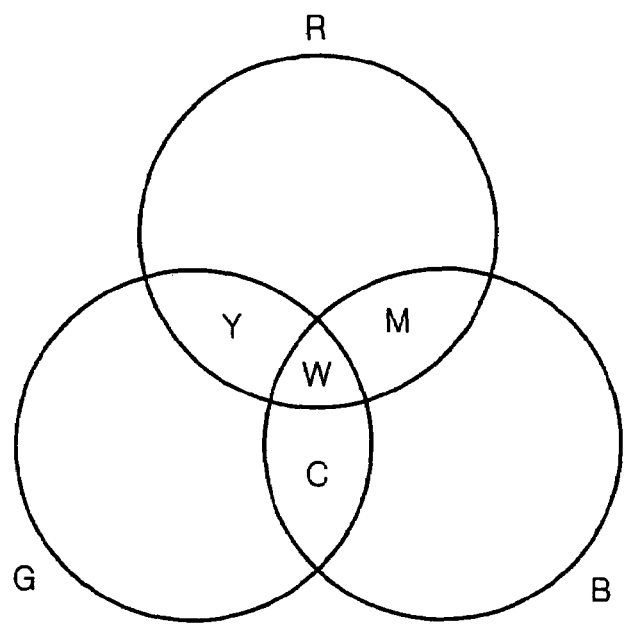
FIG. 1 illustrates a relationship between primary colors used to represent a color.
Figure 2:
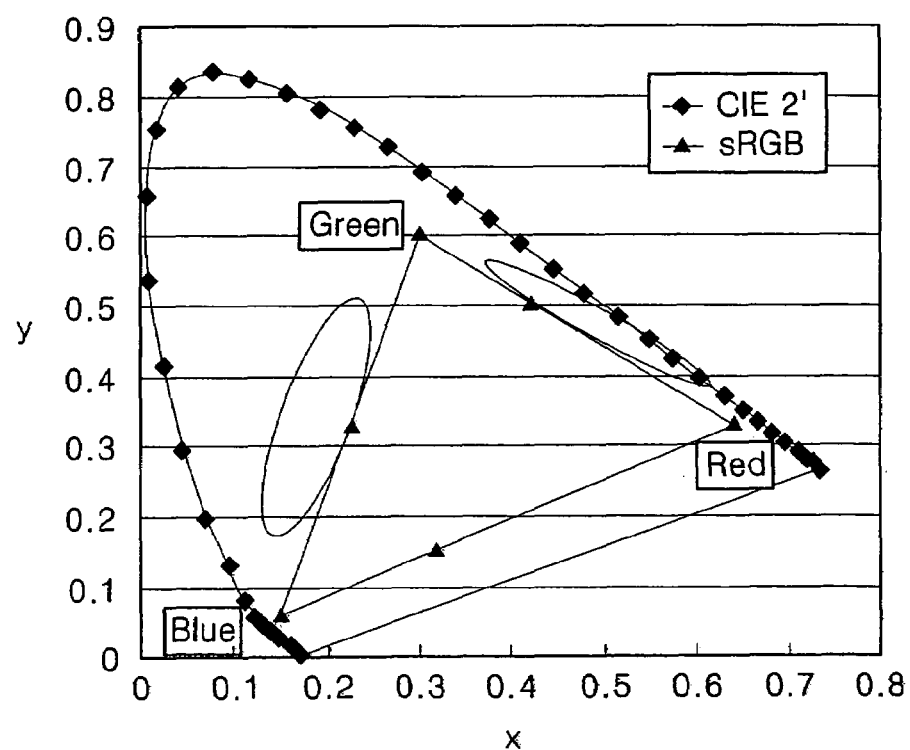
FIG. 2 is a graph showing colors that can be recognized by human being and chromaticity coordinates of RGB-combined colors.
Figure 3:
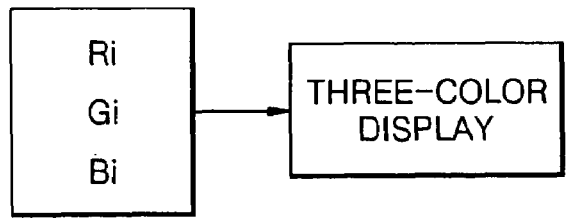
FIG. 3 is a block diagram conceptually illustrating an operation of a conventional three-color display device.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 4:
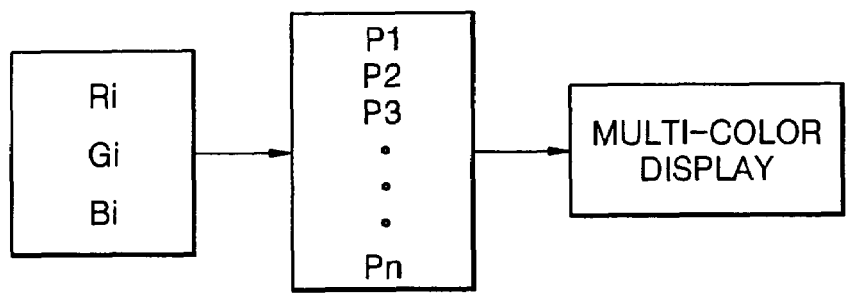
FIG. 4 is a block diagram conceptually illustrating an operation of a multi-color display device to which a color transformation method according to an embodiment of the present invention is applied.

FIG. 4 is a block diagram conceptually illustrating an operation of a multi-color display device to which a color transformation method according to an embodiment of the present invention is applied. As illustrated in FIG. 4, the multi-color display device transforms an input signal having three color components Ri, Gi, and Bi into a signal having multiple color components P1, P2, P3, . . . , and Pn and displays multiple colors.

Figure 5:
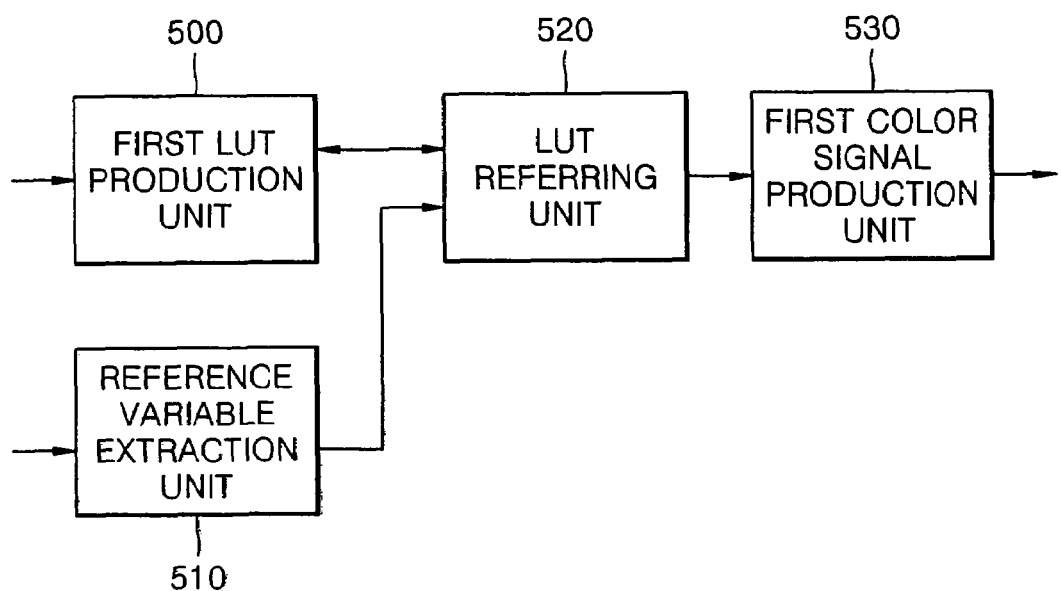
FIG. 5 is a block diagram of a structure of an apparatus for transforming a 3-color signal into a multi-color signal, according to an embodiment of the present invention.

FIG. 5 is a block diagram of a structure of an apparatus for transforming a 3-color signal into a multi-color signal, according to an embodiment of the present invention. This apparatus includes a first LUT production unit 500, a reference variable extraction unit 510, an LUT referring unit 520, and a first color signal production unit 530.

The first look up table (LUT) production unit 500 produces a lookup table including signal values of (n-3) of n color components of a color existing within a three-dimensional color space and reference variables corresponding to the signal values of the (n-3) color components. The reference variable extraction unit 510 extracts the reference variables from an input color signal having three color components and outputs the reference variables to the LUT referring unit 520.

The LUT referring unit 520 receives the extracted reference variables from the reference variable extraction unit 510, refers to the lookup table using the reference variables, and outputs the signal values of the (n-3) color components to the first color signal production unit 530. The first color signal production unit 530 produces a color signal having n color components using the signal values of the (n-3) color components.

Figure 6:
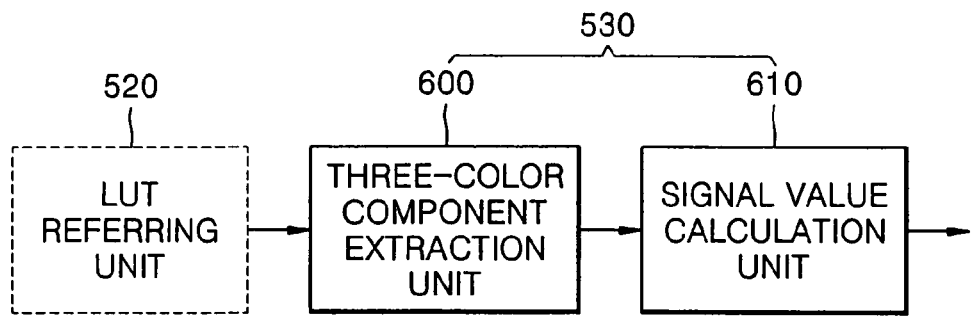
FIG. 6 is a block diagram of a first color signal production unit shown in FIG. 5.

FIG. 6 is a block diagram of the first color signal production unit 530. The first color signal production unit 530 includes a three-color component extraction unit 600 and a signal value calculation unit 610.

The three-color component extraction unit 600 removes a signal having the signal values of the (n-3) color components received from the LUT referring unit 520 from the input color signal. The signal value calculation unit 610 receives a resultant signal from the three-color component extraction unit 600 and calculates signal values of the three remaining color components of n color components of the input color signal.

Figure 7:
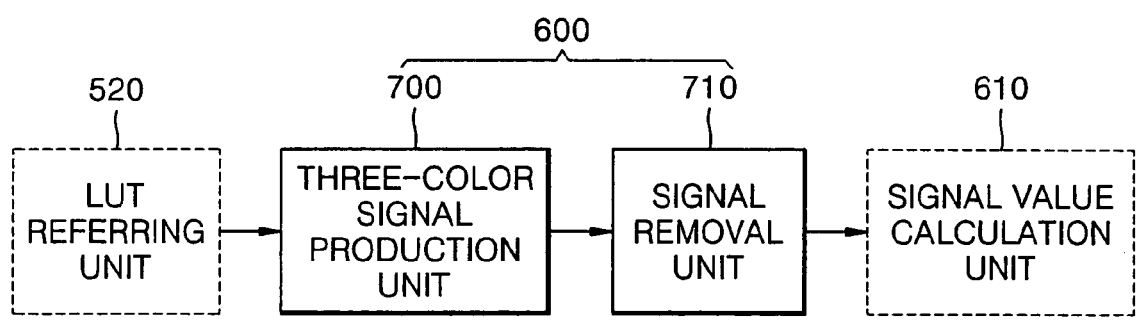
FIG. 7 is a block diagram of a three-color component extraction unit shown in FIG. 6.

FIG. 7 is a block diagram of the three-color component extraction unit 600. The three-color component extraction unit 600 includes a three-color signal production unit 700 and a signal removal unit 710.

The three-color signal production unit 700 produces a color signal of the three-dimensional color space using the signal values of the (n-3) color components received from the LUT referring unit 520. The signal removal unit 710 receives the color signal of the three-dimensional color space, which has information about the signal values of the (n-3) color components, from the three-color signal production unit 700 and removes the color signal from the input color signal.

Figure 8:
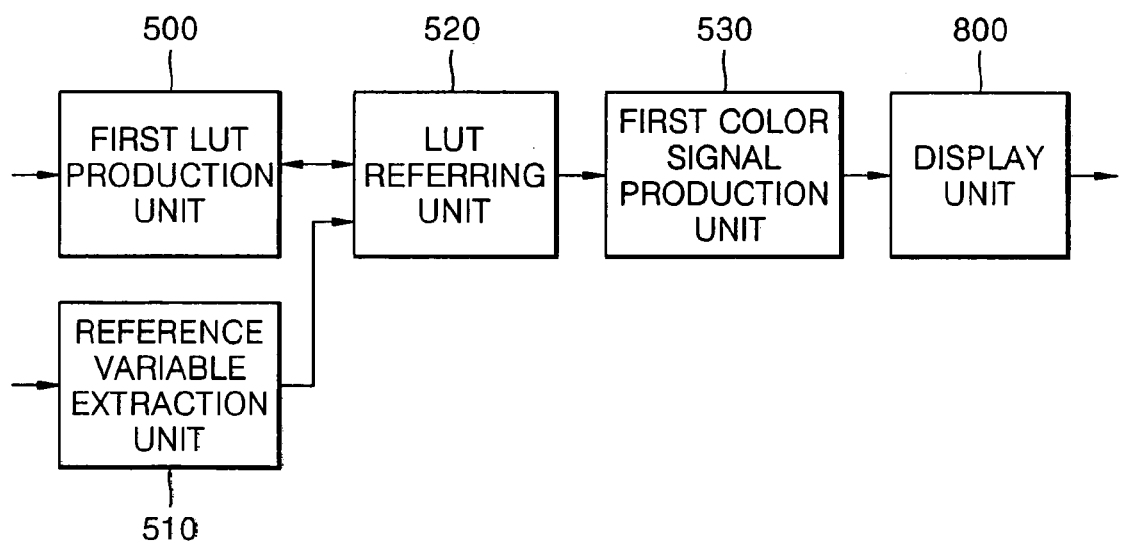
FIG. 8 is a block diagram of a structure of a multi-color display device including the apparatus of FIG. 5.

FIG. 8 is a block diagram of a structure of a multi-color display device including the apparatus of FIG. 5. The multi-color display device includes the first LUT production unit 500, the reference variable extraction unit 510, the LUT referring unit 520, the first color signal production unit 530, and a display unit 800.

Since the first LUT production unit 500, the reference variable extraction unit 510, the LUT referring unit 520, and the first color signal production unit 530 have been described with reference to FIG. 5, their description will be omitted.

The display unit 800 receives a color signal having n color components from the first color signal production unit 530 and displays the same.

Figure 9:
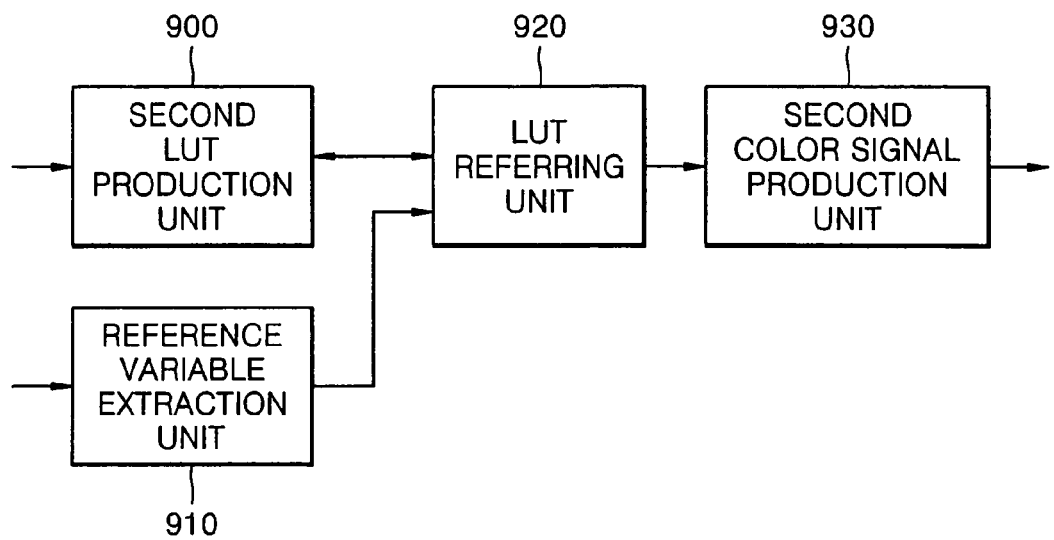
FIG. 9 is a block diagram of a structure of an apparatus for transforming a three-color signal into a multi-color signal using colors at the boundary of a color space as a reference value of a lookup table, according to another embodiment of the present invention.

FIG. 9 is a block diagram of a structure of an apparatus for transforming a three-color signal into a multi-color signal using colors at the boundary of a color space as a reference value of a lookup table, according to another embodiment of the present invention. This apparatus includes a second LUT production unit 900, a reference variable extraction unit 910, an LUT referring unit 920, and a second color signal production unit 930.

The second LUT production unit 900 produces a lookup table having signal values of (n-3) of n color components of a color existing at a boundary of a three-dimensional color space and reference variables corresponding to the signal values of the (n-3) color components. The reference variable extraction unit 910 extracts the reference variables from an input color signal having three color components and outputs the reference variables to the LUT referring unit 920. The reference variables may be a luminance signal and a hue signal.

The LUT referring unit 920 receives the reference variables from the reference variable extraction unit 910, refers to the lookup table using the reference variables, and outputs the signal values of the (n-3) color components to the second color signal production unit 930. The second color signal production unit 930 produces a color signal having n color components using the signal values of the (n-3) color components.

Figure 10:
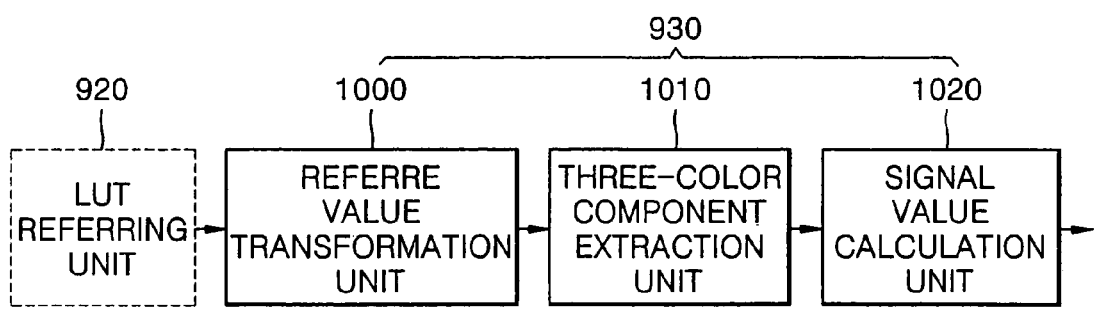
FIG. 10 is a block diagram of a second color signal production unit shown in FIG. 9.

FIG. 10 is a block diagram of the second color signal production unit 930. The second color signal production unit 930 includes a referred value transformation unit 1000, a three-color component extraction unit 1010, and a signal value calculation unit 1020.

The referred value transformation unit 1000 transforms the signal values of the (n-3) color components of the color received from the LUT referring unit 920 into signal values of (n-3) color components of the input color signal. This transformation may be performed using a chroma signal of the input color signal.

The three-color component extraction unit 1010 receives a signal having the signal values of the (n-3) color components from the referred value transformation unit 1000 and removes the same from the input color signal. The signal value calculation unit 1020 receives a resultant signal from the three-color component extraction unit 1010 and calculates signal values of three remaining color components of n color components of the input color signal.

Figure 11:
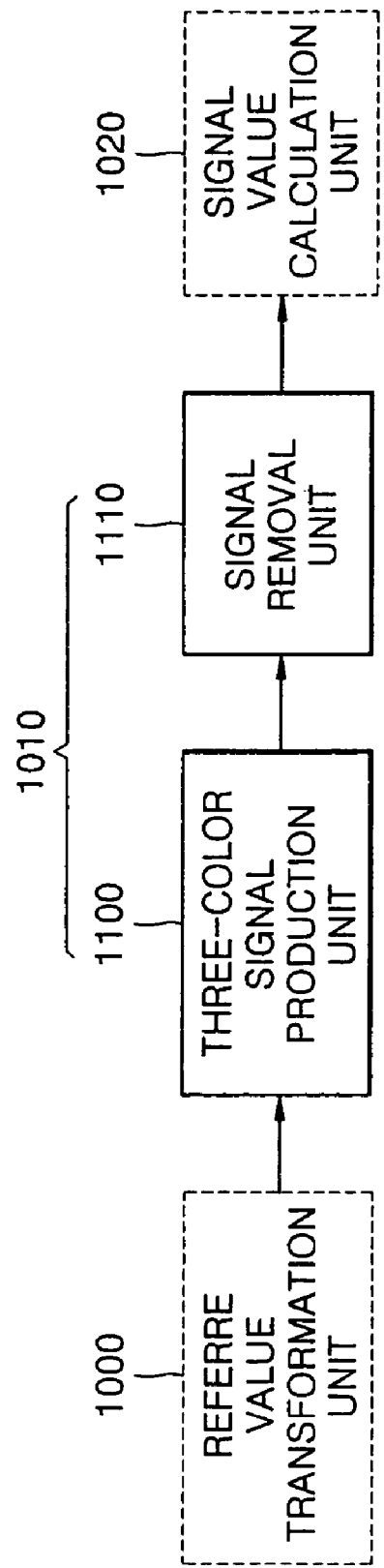
FIG. 11 is a block diagram of a three-color component extraction unit shown in FIG. 10.

FIG. 11 is a block diagram of the three-color component extraction unit 1010. The three-color component extraction unit 1010 includes a three-color signal production unit 1100 and a signal removal unit 1110.

The three-color signal production unit 1100 produces a color signal of the three-dimensional color space using the signal values of the (n-3) color components received from the referred value transformation unit 1000. The signal removal unit 1110 receives the color signal of the three-dimensional color space, which has information about the signal values of the (n-3) color components, from the three-color signal production unit 1100 and removes the color signal from the input color signal.

Figure 12:
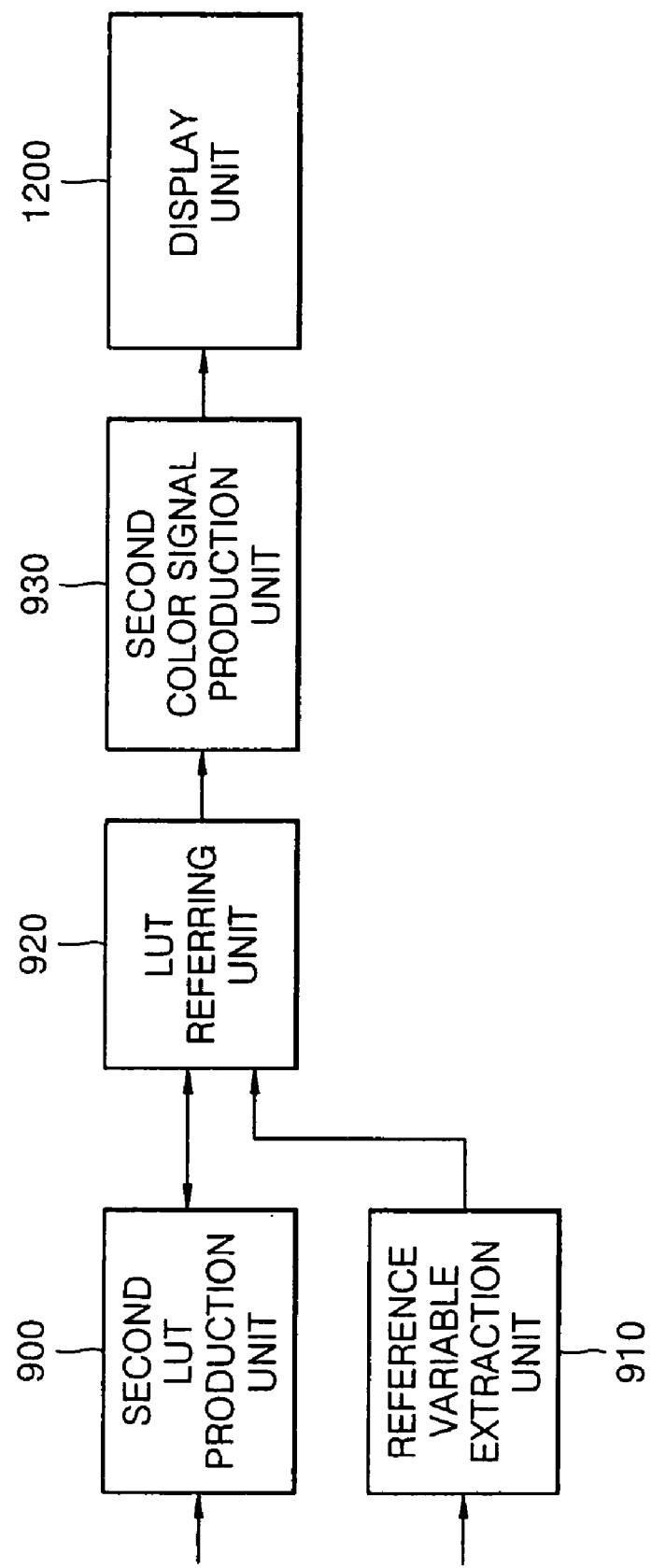
FIG. 12 is a block diagram of a structure of a multi-color display device including the apparatus of FIG. 9.

FIG. 12 is a block diagram of a structure of a multi-color display device including the apparatus of FIG. 9. The multi-color display device includes the second LUT production unit 900, the reference variable extraction unit 910, the LUT referring unit 920, the second color signal production unit 930, and a display unit 1200.

Since the second LUT production unit 900, the reference variable extraction unit 910, the LUT referring unit 920, and the second color signal production unit 930 have already been described with reference to FIG. 9, their description will be omitted here.

The display unit 1200 receives a color signal having n color components from the second color signal production unit 930 and displays the same.

Figure 13:
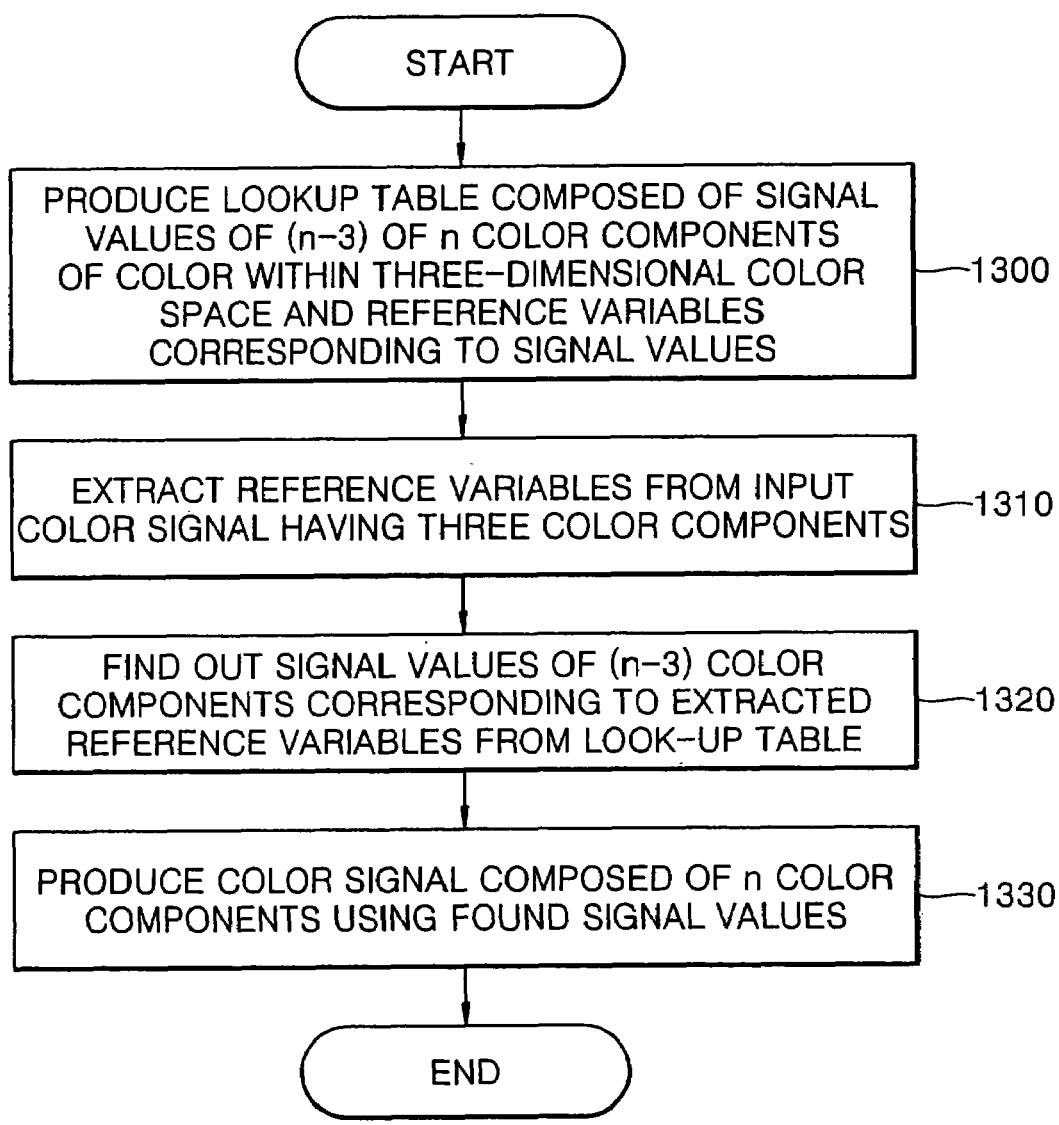
FIG. 13 is a flowchart illustrating a method of transforming a three-color signal into a multi-color signal, according to an embodiment of the present invention.

FIG. 13 is a flowchart illustrating a method of transforming a three-color signal into a multi-color signal, according to an embodiment of the present invention. First, in operation 1300, a lookup table having signal values of (n-3) of n color components of a color within a three-dimensional color space and reference variables corresponding to the signal values of the (n-3) color components is produced. In operation 1310, the reference variables are extracted from an input color signal having three color components. In operation 1320, the lookup table is referred to in order to find the signal values of the (n-3) color components corresponding to the extracted reference variables. In operation 1330, a color signal having n color components is produced using the signal values of the (n-3) color components.

Figure 14:
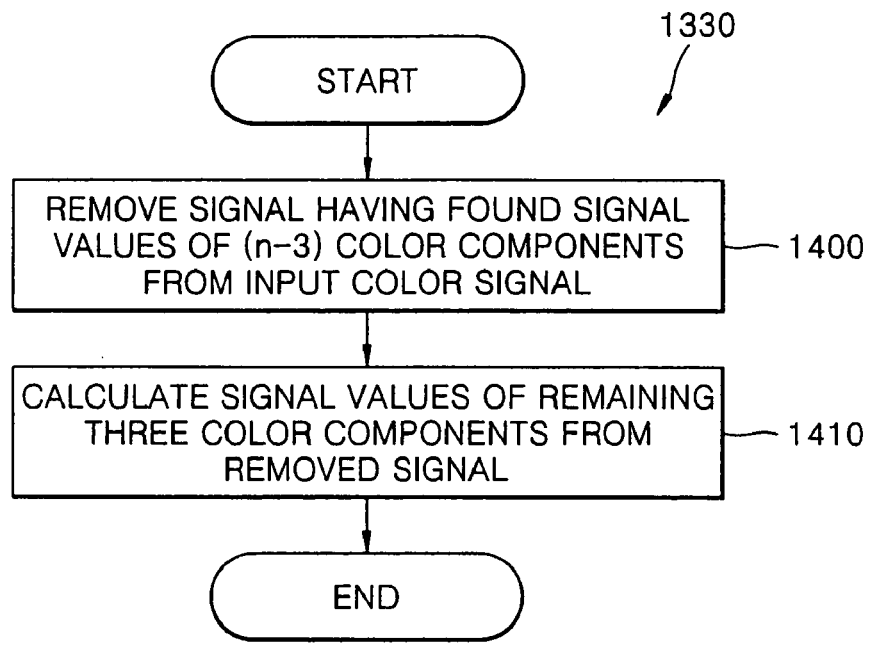
FIG. 14 is a flowchart illustrating an operation of producing a color signal composed of n color components shown in FIG. 13.

FIG. 14 is a flowchart illustrating operation 1330. First, in sub-operation 1400, a signal having the signal values of the (n-3) color components found out (i.e., determined) from the lookup table is removed from the input color signal. Then, in sub-operation 1410, signal values of the three remaining color components of the n color components of the input color signal are calculated to produce a signal having the three color components.

Figure 15:
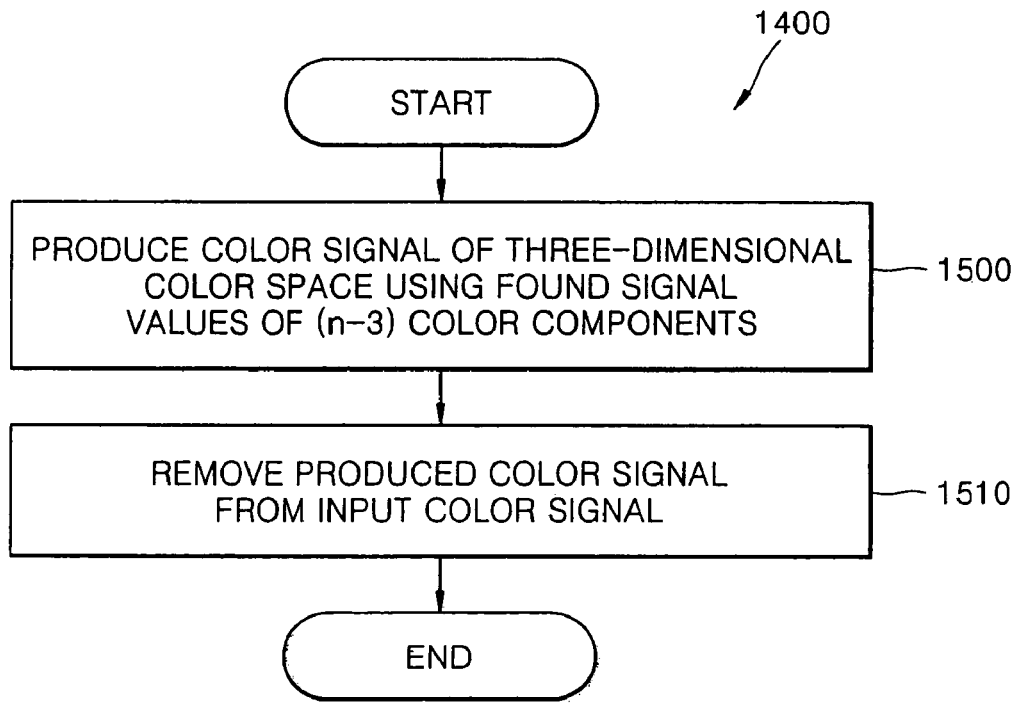
FIG. 15 is a flowchart illustrating an operation of removing a signal having signal values of (n-3) color components from an input color signal shown in FIG. 14.

FIG. 15 is a flowchart illustrating operation 1400. First, in sub-operation 1500, a color signal of the three-dimensional color space is produced using the signal values of the (n-3) color components found out from the lookup table. When the three-dimensional color space is a linearized LAB (LLAB) space, and signals L, A, and B are produced from transformed Y and C signal values, the color signal of the three-dimensional color space is calculated using Equation 1:

$$LLAB_{cy} = \begin{bmatrix} p_c & p_y \\ q_c & q_y \\ r_c & r_y \end{bmatrix} \times \begin{bmatrix} \text{transformed } value_c \\ \text{transformed } value_y \end{bmatrix} \quad (1)$$

wherein coefficients $p_c$, $p_y$, $q_c$, $q_y$, $r_c$, and $r_y$ are determined according to characteristics of color components to be found out from the lookup table.

In sub-operation 1510, the color signal of the three-dimensional color space having the signal values of the (n-3) color components is removed from the input color signal having the three color components. Since the input color signal includes all color signals of n color components, the color signal having the remaining three color components can be produced by removing the color signal having the information about the signal values of the (n-3) color components from the input color signal. When the three-dimensional color space is an LLAB, and the transformed Y and C signal values are used, the color signal having the three color components is calculated using Equation 2:

$$LLAB_{Remain} = LLAB_{in} - LLAB_{cy} \quad (2)$$

Since the value $LLLA_{Remain}$ denotes a color having three colors in a three-dimensional color space LLAB, signal values of R, G, and B color components can be obtained using Equation 3:

$$\begin{bmatrix} R \\ G \\ B \end{bmatrix} = \begin{bmatrix} \alpha_r & \beta_r & \gamma_r \\ \alpha_g & \beta_g & \gamma_g \\ \alpha_b & \beta_b & \gamma_b \end{bmatrix} \times LLAB_{Remain} \quad (3)$$

wherein coefficients $\alpha_r$, $\alpha_g$, $\alpha_b$, $\beta_r$, $\beta_g$, $\beta_b$, $\gamma_r$, $\gamma_g$, and $\gamma_b$ are determined according to characteristics of the remaining three color components, namely, R, G, and B color components.

Figure 16:
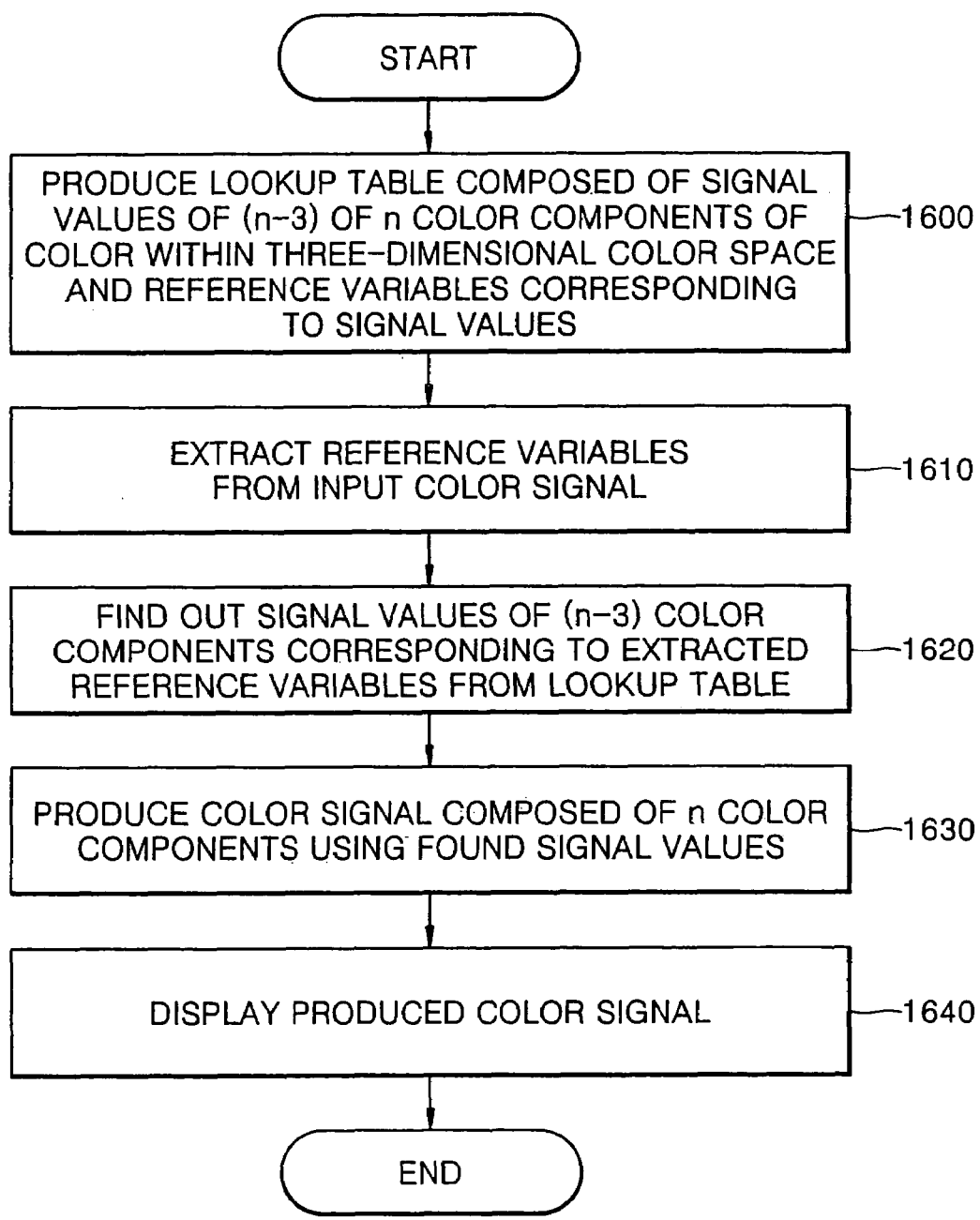
FIG. 16 is a flowchart illustrating a multi-color displaying method using a method of transforming a three-color signal into a multi-color signal, shown in FIG. 13.

FIG. 16 is a flowchart illustrating a multi-color displaying method using a method of transforming a three-color signal into a multi-color signal, as shown in FIG. 13. First, in operation 1600, a lookup table having signal values of (n-3) of n color components of a color within a three-dimensional color space and reference variables corresponding to the signal values of the (n-3) color components is produced. In operation 1610, the reference variables are extracted from an input color signal having three color components. In operation 1620, the lookup table is referred to in order to find the signal values of the (n-3) color components corresponding to the extracted reference variables. In operation 1630, a color signal having n color components is produced using the signal values of the (n-3) color components. In operation 1640, the color signal having the n color components is displayed.

Figure 17:
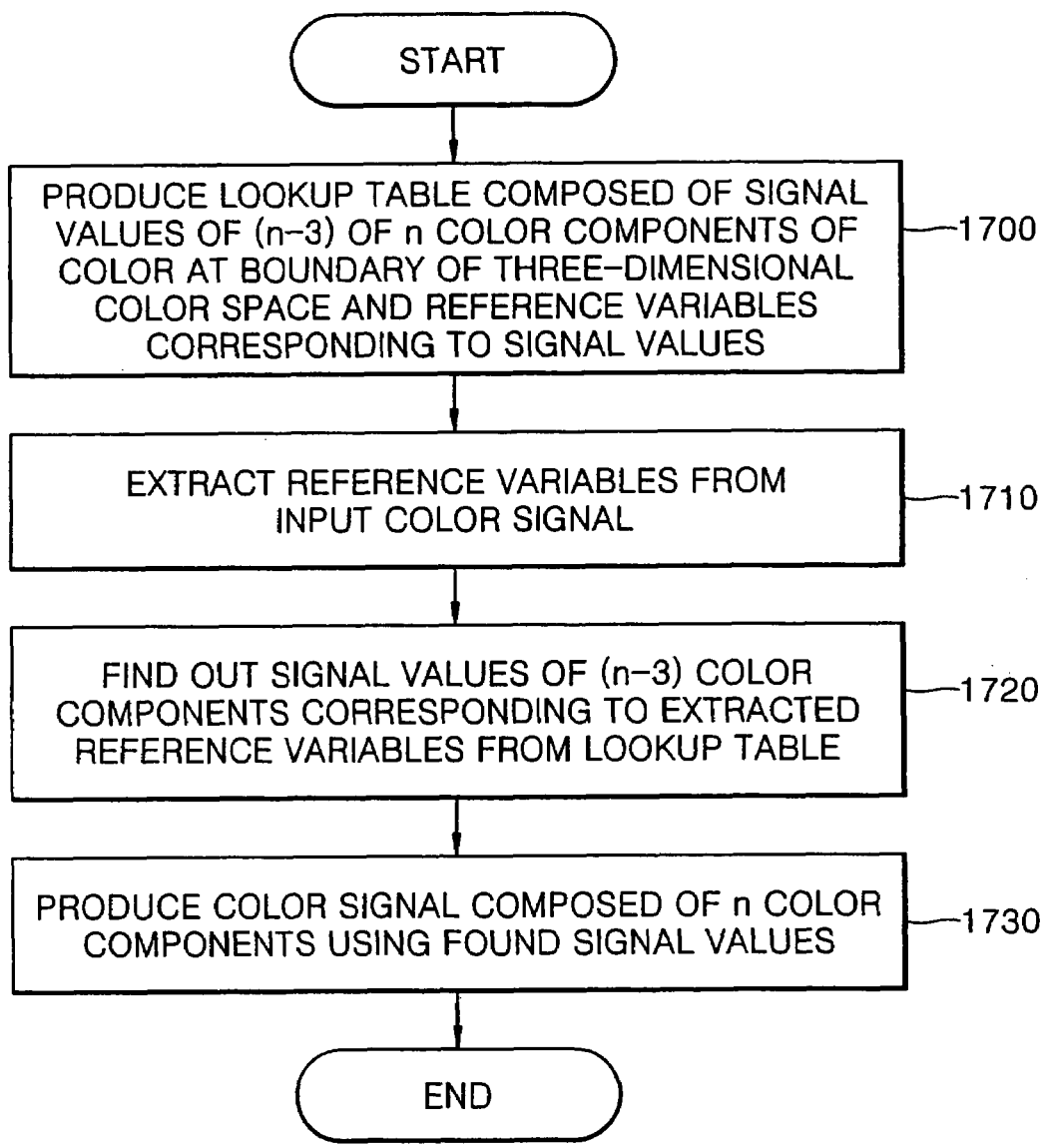
FIG. 17 is a flowchart illustrating a method of transforming a three-color signal into a multi-color signal using colors at the boundary of a color space as a reference value of a lookup table, according to another embodiment of the present invention.

FIG. 17 is a flowchart illustrating a method of transforming a three-color signal into a multi-color signal using colors at the boundary of a color space as a reference value of a lookup table, according to another embodiment of the present invention. First, in operation 1700, a lookup table having signal values of (n-3) of n color components of a color at a boundary of a three-dimensional color space and reference variables corresponding to the signal values of the (n-3) color components is produced. The reference variables may be a luminance signal and a hue signal. When the reference variables are selected from the signals L, A, and B in the linearized LAB space, this reference variable selection causes a problem because the three signals intersect at right angles. Since the signal value range of a chroma signal cannot be restricted to a specific range because of its variableness, there is a problem in setting a chroma signal as a reference variable. When the three-dimensional color space is LLAB, and the reference variables are the luminance signal and the hue signal, the color signal having the three color components is calculated using Equation 4:

$$\text{Index\_l} = \text{LLAB\_L} \quad (4)$$

$$\text{Index\_h} = \arctan\left(\frac{\text{LLAB\_B}}{\text{LLAB\_A}}\right) \quad 5$$

In operation 1710, the reference variables are extracted from an input color signal having three color components. In operation 1720, the lookup table is referred to in order to find the signal values of the (n-3) color components corresponding to the extracted reference variables. In operation 1730, a color signal having n color components is produced using the signal values of the (n-3) color components.

Figure 18:
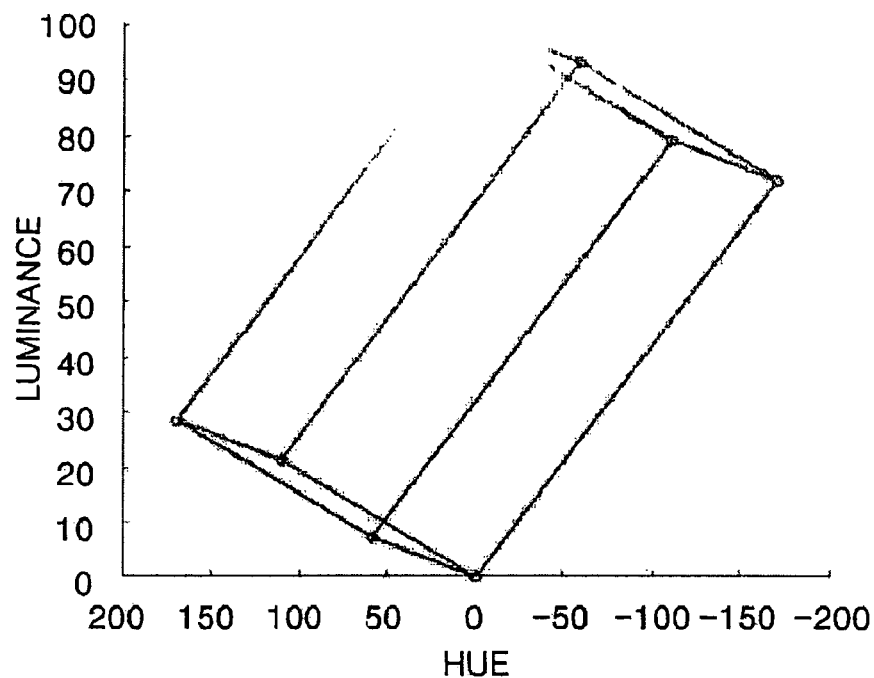
FIG. 18 is a graph showing a color space that can be represented in three color components.

FIG. 18 is a graph showing an area of colors that can be represented in three color components. In FIG. 18, an axis y indicates a luminance. The color space forms a hexahedron in the third dimension using straight lines representing the three color components that originate from a starting point (0,0).

Figure 19:
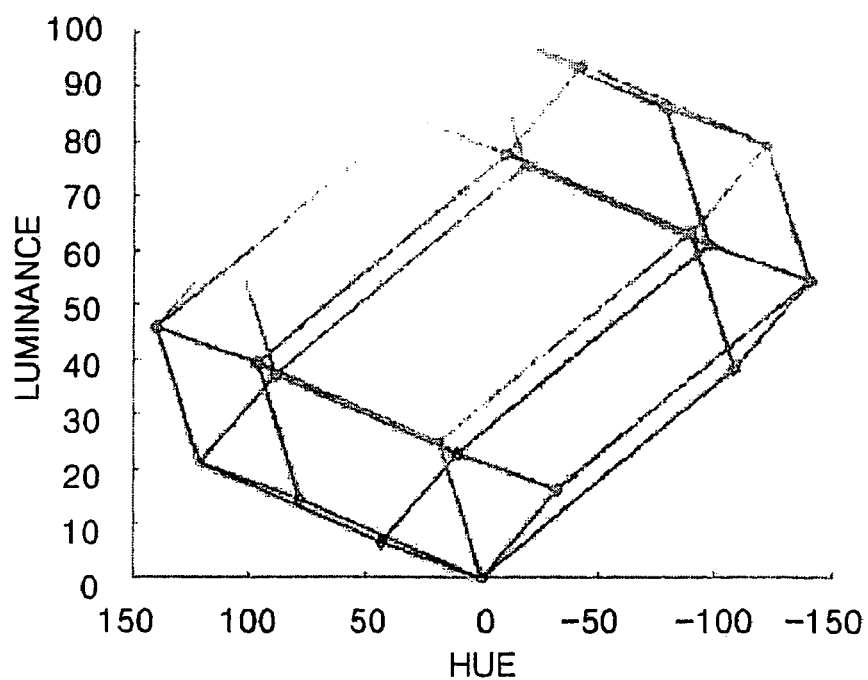
FIG. 19 is a graph showing a color space that can be represented in five color components.

FIG. 19 is a graph showing an area of colors that can be represented in five color components. In FIG. 19, an axis y indicates a luminance. The color space forms an icosahedron in the third dimension using straight lines representing the five color components that originate from the starting point (0,0).

Hence, a color space that a display device can represent using a color signal having n color components forms a polyhedron having n×(n-1) faces. Since a boundary of the color space is a straight line on the third dimension, a color at the boundary of the color space can constitute a lookup table using only two reference variables so that each of the n color components corresponds to each of the two reference variables.

Figure 20:
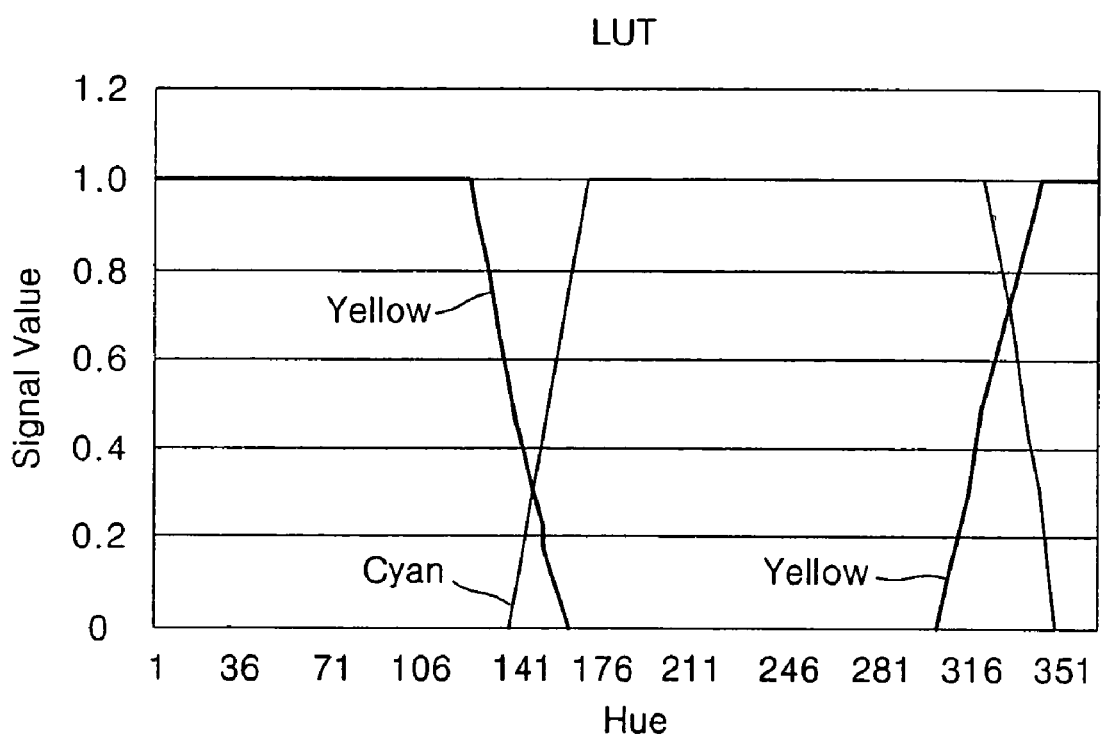
FIG. 20 is a graph showing a relationship between a reference variable and a reference value included in a lookup table according to the present invention.

FIG. 20 is a graph showing a relationship between a reference variable and a reference value included in a lookup table, according to an embodiment of the present invention. In this relationship, a luminance signal and a hue signal are set as reference variables, and a luminance signal reference variable L_index is set to be 50. Signal values of a yellow (Y) signal and a cyan (C) signal of a color at a boundary of a color space that can be represented in a color signal having five color components can be known from FIG. 20. The lookup table is formed using signal values of the Y and C signals as to-be-detected values corresponding to the reference variables, which are the luminance and hue signals.

Figure 21:
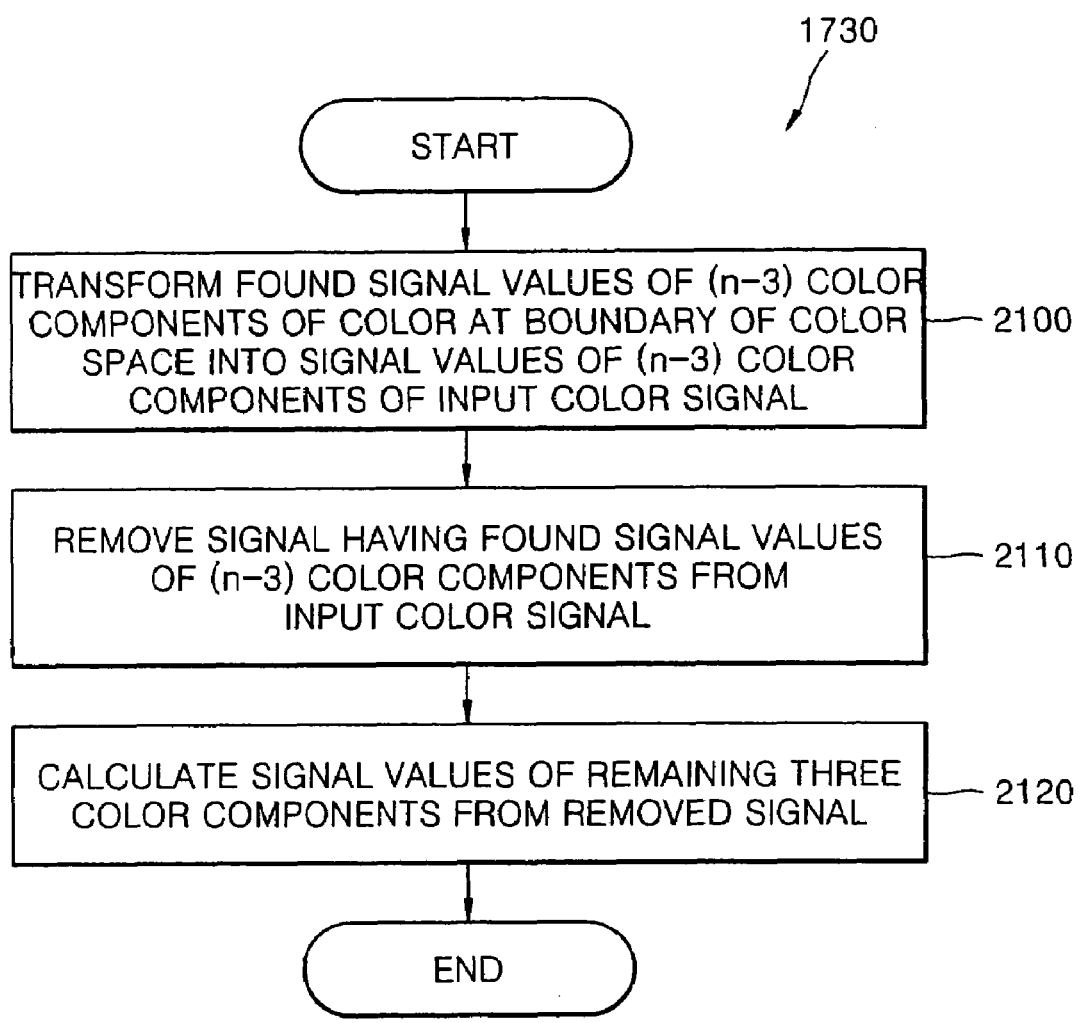
FIG. 21 is a flowchart illustrating an operation of producing a color signal composed of n color components using referred signal values shown in FIG. 17.

FIG. 21 is a flowchart illustrating operation 1730 shown in FIG. 17. in sub-operation 2100, the signal values of the (n-3) color components of the color at the boundary of the color space found out from the lookup table are transformed into signal values of (n-3) color components of the input color signal. More specifically, in operation 2100, when the three-dimensional color space is LLAB, and the reference variables are the luminance signal and the hue signal, the signal values of the (n-3) color components of the color at the boundary of the color space found out from the lookup table can be transformed into the signal values of the (n-3) color components of the input color signal using a chroma signal of the input color signal as expressed in Equation 5:

$$\text{c\_ratio} = \frac{\text{current\_chroma}}{\text{chroma\_max}} \quad (5)$$

$$\text{l\_gray} = \text{LLAB\_L} \times 0.01$$

if (referred value > 0) or (c_ratio > 0)

-continued $$\text{transformed value} = \text{l\_gray} + (\text{referred value} - \text{l\_gray}) \times \text{c\_ratio}$$

In Equation 5, the transformed value is calculated only when the referred value exists and an input signal is a hue signal. In Equation 5, chroma_max denotes a maximum hue signal value within a color space, and current_chroma denote a hue signal value of a current input color. when a ratio of the two values, c_ratio, is calculated, it can be determined whether the input color is either a color at a boundary of the color space or a color within the color space. If it is determined that the input color is a color within the color space, the referred value is changed in accordance with the ratio c_ratio. Since the ratio c_ratio relates to a luminance signal value LLAB_L, the transformed value is obtained with reference to value l_gray, which is a product of the luminance signal value LLAB_L and a constant.

in sub-operation 2110, a signal having the signal values of the (n-3) color components found out from the lookup table is removed from the input color signal. Then, in sub-operation 2120, signal values of the three remaining color components of the n color components of the input color signal are calculated to produce a signal having the three color components. Consequently, when the transformed signal values of the (n-3) color components obtained in sub-operation 2110 are added to the signal values of the three color components obtained in sub-operation 2120, the color signal having n color components is produced.

Figure 22:
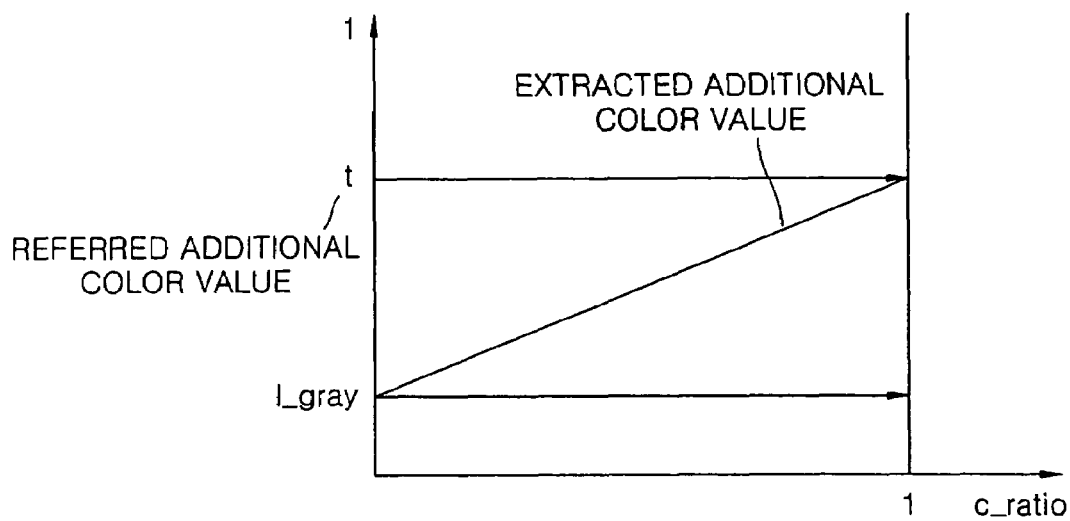
FIG. 22 is a graph showing an example of a method of transforming the referred signal values.

FIG. 22 is a graph showing an example of a method of transforming the referred (i.e., found out from the lookup table) signal values. When the three-dimensional color space is LLAB, and the reference variables are a luminance signal and a hue signal, the signal values of the (n-3) color components of the color at the boundary of the color space found out from the lookup table can be transformed into the signal values of the (n-3) color components of the input color signal according to a chroma ratio c_ratio. When the chroma ratio c_ratio is 1, the referred signal values (t) of the (n-3) color components of the color at the boundary of the color space become the signal values of the (n-3) color components of the input color signal. when the chroma ratio c_ratio decreases, the signal values of the (n-3) color components of the input color signal linearly decreases. When the chroma ratio c_ratio reaches 0, the signal values of the (n-3) color components of the input color signal become the value l_gray, which relates to the luminance signal value.

Figure 23:
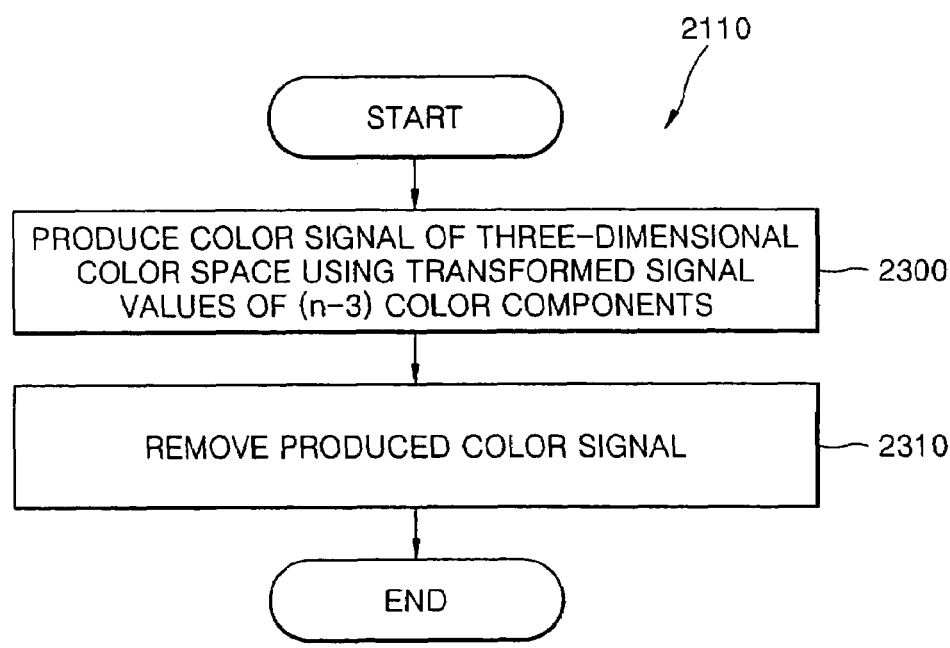
FIG. 23 is a flowchart illustrating an operation of removing a signal having signal values of (n-3) color components from an input color signal shown in FIG. 21.

FIG. 23 is a flowchart illustrating sub-operation 2110 of FIG. 21. First, in sub-operation 2300, a color signal of the three-dimensional color space is produced using the transformed signal values of the (n-3) color components. When the three-dimensional color space is LLAB, and the signals L, A, and B are produced from the transformed Y and C signal values, the color signal of the three-dimensional color space is calculated using Equation 1.

In sub-operation 2310, the color signal of the three-dimensional color space having the signal values of the (n-3) color components produced in sub-operation 2300 is removed from the input color signal having the three color components. Since the input color signal includes all color signals of n color components, the color signal having the remaining three color components can be produced by removing the color signal having the information about the signal values of the (n-3) color components from the input color signal. When the three-dimensional color space is LLAB, and the transformed Y and C signal values are used, the color signal having the three color components is calculated using Equation 2.

Since the value $LLLA_{Remain}$ calculated in Equation 2 denotes a color having three colors in a three-dimensional color space LLAB, signal values of R, G, and B color components can be obtained using Equation 3.

FIG. 24 is a flowchart illustrating a multi-color displaying method using a method of transforming a three-color signal into a multi-color signal, as shown in FIG. 21. First, in operation 2400, a lookup table having signal values of (n-3) of n color components of colors at the boundary of a three-dimensional color space that can represent a color in three components and reference variables corresponding to the signal values of the (n-3) color components is produced. In operation 2410, the reference variables are extracted from an input color signal having three color components. In operation 2420, the lookup table is referred to in order to find the signal values of the (n-3) color components corresponding to the extracted reference variables. In operation 2430, a color signal having n color components is produced using the found signal values of the (n-3) color components. In operation 2440, the color signal having the n color components is displayed.

Although transforming a color signal having three color components into a color signal having five color components R, G, B, C, and Y has been described herein, it is to be understood that the present invention is not limited to a color signal having these five color components. Instead, the present invention is applicable to a method and apparatus for transforming an input color signal having m color components into a color signal having n (n>m) color components.

As described above, in methods and apparatuses for transforming a three-color signal into a multi-color signal according to the above-described embodiments of the present invention, a size of a lookup table from which multiple color signal values are found out is reduced, and the found color signal values are used to extract the remaining color signal values to reduce errors generated upon signal transformation. Thus, the three-color signal can be easily transformed into the multi-color signal having a higher-dimensional color space.

The above-described embodiments of the present invention can also be embodied as computer readable codes on, for example a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of transforming a color signal having three color components into a color signal having more than three color components, represented by first through n-th color components, the method comprising:

producing a lookup table having signal values of (n-3) of n color components of a color within a three-dimensional color space and reference variables corresponding to the signal values of the (n-3) color components;

extracting the reference variables from an input color signal;

determining the signal values of the (n-3) color components corresponding to the extracted reference variables from the lookup table; and producing a color signal having n color components using the determined signal values of the (n-3) color components based on a removal of determined respective color component information from the input color signal.

2. The method of claim 1, wherein the producing a color signal includes:

removing a signal having signal values of the determined (n-3) color components from the input color signal; and calculating signal values of three color components remaining by removing the (n-3) color components from the input color signal.

3. The method of claim 2, wherein the removing a signal includes:

producing a color signal of a three-dimensional color space using the determined signal values of the (n-3) color components; and removing the produced color signal from the input color signal.

4. The method of claim 1, further comprising displaying the color signal having the n color components.

5. A method of transforming a color signal having three color components into a color signal having more than three color components, represented by first through n-th color components, the method comprising:

producing a lookup table having signal values of (n-3) of n color components of a color at a boundary of a three-dimensional color space and reference variables corresponding to the signal values of the (n-3) color components;

extracting the reference variables from an input color signal;

determining the signal values of the (n-3) color components corresponding to the extracted reference variables from the lookup table; and producing a color signal having n color components using the determined signal values of the (n-3) color components based on a removal of determined respective color component information from the input color signal.

6. The method of claim 5, wherein the reference variables are a luminance signal and a hue signal.

7. The method of claim 5, wherein the producing a color signal includes:

transforming the determined signal values of the (n-3) color components of the color at the boundary of the color space into signal values of the (n-3) color components of the input color signal;

removing a signal having the transformed signal values of the (n-3) color components from the input color signal; and calculating signal values of three remaining color components removing the (n-3) color components from the input color signal.

8. The method of claim 7, wherein, in the transforming of the found signal values, the found signal values of the (n-3) color components of the color at the boundary of the color space are transformed into the signal values of the (n-3) color components of the input color signal using a chroma signal of the input color signal.

9. The method of claim 7, wherein the removing a signal includes:

producing a color signal of a three-dimensional color space using the transformed signal values of the (n-3) color components; and removing the produced color signal from the input color signal.

10. The method of claim 5, further comprising displaying the color signal having the n color components.

11. An apparatus for transforming a color signal having three color components into a color signal having more than three color components, represented by first through n-th color components, the apparatus comprising:
- a look up table LUT production unit producing a lookup table having signal values of (n-3) of n color components of a color within a three-dimensional color space and reference variables corresponding to the signal values of the (n-3) color components;
- a reference variable extraction unit extracting the reference variables from an input color signal having three color components;
- an LUT referring unit receiving the extracted reference variables and determining the signal values of the (n-3) color components corresponding to the extracted reference variables from the lookup table; and
- a color signal production unit producing a color signal composed of n color components using the determined signal values of the (n-3) color components based on a removal of determined respective color component information from the input color signal.

12. The apparatus of claim 11, wherein the color signal production unit includes:
- a three color component extraction unit removing a signal having signal values of the determined (n-3) color components from the input color signal; and
- a signal value calculation unit calculating signal values of three remaining color components by removing the (n-3) color components from the input color signal.

13. The apparatus of claim 12, wherein the three color component extraction unit includes:
- a three-color signal production unit producing a color signal of a three-dimensional color space using the determined signal values of the (n-3) color components; and
- a signal removal unit removing the color signal produced by the three-color signal production unit from the input color signal.

14. The apparatus of claim 11, further comprising a display unit displaying the color signal having the n color components.

15. An apparatus for transforming a color signal having three color components into a color signal having more than three color components, represented by first through n-th color components, the apparatus comprising:
- a look up table LUT production unit producing a lookup table having signal values of (n-3) of n color components of a color at a boundary of a three-dimensional color space and reference variables corresponding to the signal values of the (n-3) color components;
- a reference variable extraction unit extracting the reference variables from an input color signal having three color components;
- an LUT referring unit receiving the extracted reference variables and determining the signal values of the (n-3) color components corresponding to the extracted reference variables from the lookup table; and
- a color signal production unit producing a color signal having n color components using the determined signal values of the (n-3) color components based on a removal of determined respective color component information from the input color signal.

16. The apparatus of claim 15, wherein the reference variables are a luminance signal and a hue signal.

17. The apparatus of claim 15, wherein the signal production unit includes:
- a referred value transformation unit transforming the determined signal values of the (n-3) color components of the color at the boundary of the color space into signal values of the (n-3) color components of the input color signal;
- a three color component extraction unit removing a signal having the transformed signal values of the (n-3) color components from the input color signal; and
- a signal value calculation unit calculating signal values of three remaining color components by removing the (n-3) color components from the input color signal.

18. The apparatus of claim 17, wherein the referred value transformation unit transforms the determined signal values of the (n-3) color components of the color at the boundary of the color space into the signal values of the (n-3) color components of the input color signal using a chroma signal of the input color signal.

19. The apparatus of claim 17, wherein the three color component extraction unit includes:
- a three-color signal production unit producing a color signal of a three-dimensional color space using the transformed signal values of the (n-3) color components; and
- a signal removal unit removing the color signal produced by the three-color signal production unit from the input color signal.

20. The apparatus of claim 15, further comprising a display unit displaying the color signal having the n color components.

21. A computer-readable storage medium encoded with processing instructions for causing a processor to perform a method of transforming a color signal having three color components into a color signal having more than three color components, represented by first through n-th color components, the method comprising:
- producing a lookup table having signal values of (n-3) of n color components of a color within a three-dimensional color space and reference variables corresponding to the signal values of the (n-3) color components;
- extracting the reference variables from an input color signal;
- determining the signal values of the (n-3) color components corresponding to the extracted reference variables from the lookup table; and
- producing a color signal having n color components using the determined signal values of the (n-3) color components based on a removal of determined respective color component information from the input color signal.

22. A computer-readable storage medium encoded with processing instructions for causing a processor to perform a method of transforming a color signal having three color components into a color signal having more than three color components, represented by first through n-th color components, the method comprising:
- producing a lookup table having signal values of (n-3) of n color components of a color at a boundary of a three-dimensional color space and reference variables corresponding to the signal values of the (n-3) color components;
- extracting the reference variables from an input color signal;
- determining the signal values of the (n-3) color components corresponding to the extracted reference variables from the lookup table; and
- producing a color signal having n color components using the determined signal values of the (n-3) color components based on a removal of determined respective color component information from the input color signal.

23. An apparatus for transforming an input color signal having three color components into a color signal having more than three color components, represented by first through n-th color components, comprising:
  a look up table (LUT) production unit producing a lookup table having signal values of a specified number of n color components of a color within a three-dimensional color space and reference variables corresponding to the signal values of the specified number of color components;
  a LUT referring unit receiving extracted reference variables from the input color signal and determining the signal values of the specified number of color components corresponding to the extracted reference variables; and
  a color signal production unit producing a color signal having n color components based on a color signal using the determined signal values of the specified number of color components, a comparison of the determined signal values of the specified number of color components and the input color signal, and another color signal representing a different conversion of the input color signal based on a result of the comparison.

24. The apparatus of claim 23, wherein the specified number is n-3.

25. An apparatus for transforming an input color signal having three color components into a color signal having more than three color components, represented by first through n-th color components, comprising:
  a look up table (LUT) production unit producing a lookup table having signal values of a specified number of n color components of a color within a three-dimensional color space and reference variables corresponding to the signal values of the specified number of color components;
  a LUT referring unit receiving extracted reference variables from the input color signal and determining the signal values of the specified number of color components corresponding to the extracted reference variables; and
  a color signal production unit producing a color signal having n color components based on a color signal using the determined signal values of the specified number of color components and another color signal representing a different conversion of the input color signal using the specified number of color components,
  wherein the three-dimensional color space is a linearized LAB (LLAB) space, signals L, A, and B are produced from transformed Y and C signal values, and the color signal of the three-dimensional color space is calculable by the following equation $$LLAB_{cy} = \begin{bmatrix} p_c & p_y \\ q_c & q_y \\ r_c & r_y \end{bmatrix} \times \begin{bmatrix} \text{transformed } value_c \\ \text{transformed } value_y \end{bmatrix},$$

and wherein coefficients $p_c$, $p_y$, $q_c$, $q_y$, $r_c$ and $r_y$ are determined according to characteristics of color components determined from the lookup table.

26. The apparatus of claim 25, wherein the color signal having the three color components is calculable using the following equation:

$$LLAB_{Remain} = LLAB_{In} - LLAB_{cy}, \text{ and}$$

wherein $LLLA_{Remain}$ denotes a color having three colors in the LLAB three-dimensional color space.

27. The apparatus of claim 26, wherein signal values of R, G, and B color components are calculable by the following equation:

$$\begin{bmatrix} R \\ G \\ B \end{bmatrix} = \begin{bmatrix} \alpha_r & \beta_r & \gamma_r \\ \alpha_g & \beta_g & \gamma_g \\ \alpha_b & \beta_b & \gamma_b \end{bmatrix} \times LLAB_{Remain},$$

wherein coefficients $\alpha_r$, $\alpha_g$, $\alpha_b$, $\beta_r$, $\beta_g$, $\beta_b$, $\gamma_r$, $\gamma_g$, and $\gamma_b$ are determined according to characteristics of the three remaining color components, namely, R, G, and B color components.

28. An apparatus for transforming an input color signal having three color components into a color signal having more than three color components, represented by first through n-th color components, comprising:
  a look up table LUT production unit producing a lookup table having signal values of a specified number of n color components of a color at a boundary of a three-dimensional color space and reference variables corresponding to the signal values of the specified number of color components;
  an LUT referring unit receiving the extracted reference variables from the input color signal and determining the signal values of the specified number of color components corresponding to the extracted reference variables from the lookup table; and
  a color signal production unit producing a color signal having n color components based on a color signal using the determined signal values of the specified number of color components, a comparison of the determined signal values of the specified number of color components and the input color signal, and another color signal representing a different conversion of the input color signal based on a result of the comparison.

29. The apparatus of claim 28, wherein the three-dimensional color space is a linearized LLAB space, the reference variables are a luminance signal and a hue signal, and the input color signal is calculable by the following equation:

$$\text{Index\_l} = \text{LLAB\_L}$$

$$\text{Index\_h} = \arctan\left(\frac{\text{LLAB\_B}}{\text{LLAB\_A}}\right).$$

* * * * *